United States Patent [19]

Nakagawa et al.

[11] Patent Number: 4,770,045
[45] Date of Patent: Sep. 13, 1988

[54] PRESSURE SENSOR

[75] Inventors: Katsumi Nakagawa, Kariya; Takeshi Nakane, Okazaki, both of Japan

[73] Assignee: Aisin Seiki Kabushiki Kaisha, Aichi, Japan

[21] Appl. No.: 25,025

[22] Filed: Mar. 12, 1987

[30] Foreign Application Priority Data

Mar. 14, 1986 [JP] Japan .................. 61-054947

[51] Int. Cl.⁴ .................. G01L 7/08; G01L 9/04
[52] U.S. Cl. .................. 73/726; 73/720; 73/756; 338/4
[58] Field of Search .................. 73/717, 718, 719, 720, 73/721, 722, 723, 724, 725, 726, 727, 728, 753, 754, 756; 338/4

[56] References Cited

U.S. PATENT DOCUMENTS 3,808,480  4/1974  Johnston .................. 73/718
4,411,158 10/1983  Schaff, Jr. .................. 73/727

FOREIGN PATENT DOCUMENTS 0022125  2/1980  Japan .................. 73/754

Primary Examiner—Donald O. Woodiel
Attorney, Agent, or Firm—Sughrue, Mion, Zinn, Macpeak & Seas

[57] ABSTRACT

A pressure sensor converts a fluid pressure into electric signals upon displacement of a diaphragm. The pressure sensor includes a plurality of strain gauges which are formed on a moveable part of the diaphragm with terminal portions formed on a stationary part of the diaphragm. Readout wires are connected to the terminal portions of the strain gauges on the stationary part of the diaphragm.

2 Claims, 1 Drawing Sheet

PRESSURE SENSOR

BACKGROUND OF THE INVENTION

1. Field of the Invention

This invention relates to a pressure sensor for converting a fluid pressure into an electrical signal, and more particularly, to a pressure sensor of the type including a moveable member which is subjected to a fluid pressure thereby causing a displacement of the moveable member, such displacement being converted into an electrical signal.

2. Description of the Prior Art

Many kinds of pressure sensor have been suggested. For example, U.S. Pat. No. 4,453,412 discloses a diaphragm type pressure sensor which has an amorphous metal member fixed to the diaphragm. The amorphous metal member is stressed by the pressure displacement of the diaphragm and the sensor detects the change in the magnetic characteristics of the amorphous metal member. Therefore, in this type of pressure sensor, which has a detecting structure fixed to the diaphragm, the diaphragm is subjected to fatigue since the normal displacement of the diaphragm is prevented by the amorphous metal member secured thereto. Thus, this type of pressure sensor has a life span which isrelatively short.

U.S. Pat. Nos. 4,488,436 and 4,500,864 each disclose a diaphragm type pressure sensor with a strain gauge affixed to the diaphragm. This type pressure sensor has terminals provided directly on the diaphragm to connect conductive wires to the strain gauge for obtaining a readout. Therefore, in this type of pressure sensor, which has the readout wires fixed to the diaphragm, fatigue will occur in the diaphragm similar to the fatigue experienced by the amorphous metal type pressure sensor. Furthermore, the terminals might become separated from the diaphragm after repeated displacement of the diaphragm since the stress is concentrated at the terminals.

Thus the conventional type pressure sensors have a structural problem whereby the characteristics of the pressure detection are changed by the repeated displacement of the diaphragm. Further, the conventional type pressure sensor has a less sensitive characteristic for a small pressure change since the fixed member on the diaphragm, such as an amorphous metal member or the readout wires, prevents a small displacement of the diaphragm for a small pressure change.

SUMMARY OF THE INVENTION

Accordingly, one of the objects of this invention is to provide an improved pressure sensor assembly which obviates the above mentioned drawbacks.

It is also an object of this invention to provide a sensitive airtight pressure sensor which is capable of detecting minimum pressure changes.

It is another object of the invention to provide a simple structured pressure sensor which provides sensitive detection for all pressures but which is strong and durable to provide a long life.

A further object of this invention is to provide a sensitive pressure sensor at low cost which is suitable for mass production and which provides a linear characteristic for an applied pressure change.

To achieve the above objects the pressure sensor according to the present invention comprises a pressure sensor comprising:

pressure responding means having a stationary part and a moveable part adapted to be displaced relative to said stationary part in response to a pressure applied thereto;

support means sealingly engaging said stationary part of said pressure responding means;

chamber means defined in said support means by said pressure responding means;

detecting means connected to said moveable part to detect displacement thereof upon application of pressure to said moveable part; and terminal means fixed to the stationary part of said pressure responding means.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
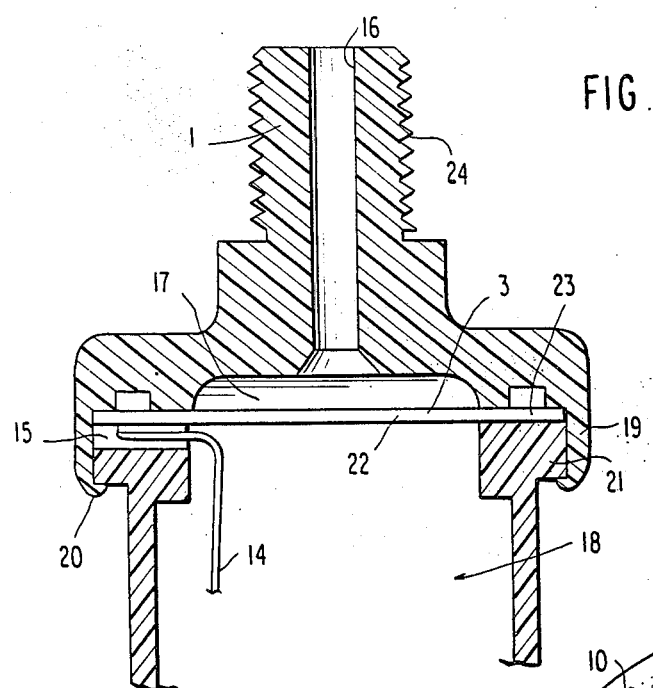
FIG. 1 is a partial cross sectional view of a pressure sensor according to a preferred embodiment of the present invention.

Referring now to FIG. 1 the outer circumference of a diaphragm 3 is held between a first housing 1 and a second housing 2. The first housing 1 is formed from an electrical insulation material and is provided with a central bore 16 adapted to be connected to a pressure source (not shown). A first chamber 17, connected with a central bore 16 is formed in the first housing 1 and a screw thread 24 is formed on the outside wall of one end of the first housing 1 in order to attach the pressure source. A flange 19 is also formed integrally all around the outside wall of the first housing 1.

Figure 3:
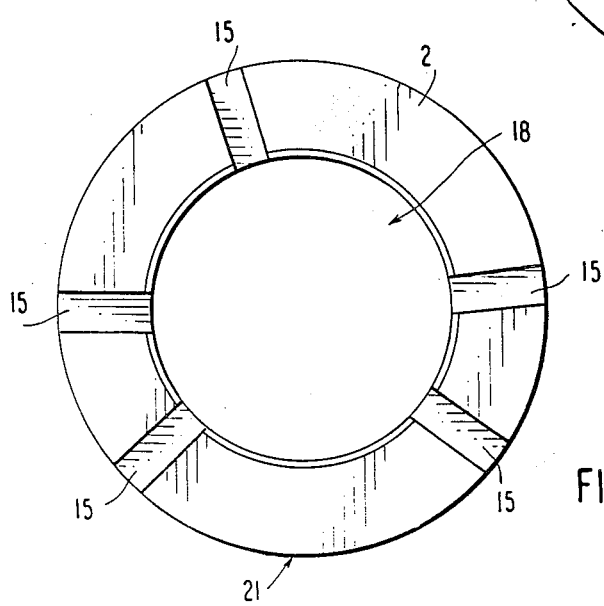
FIG. 3 is a plan view of the second housing according to the preferred embodiment of the present invention.

A second housing 2 is a cylindrical member formed from an electrical insulation material and a second chamber 18 which is opposed to the first chamber 17 is formed in the second housing 2. The second chamber 18 is connected with the atmosphere. A guard flange 21 is formed integrally on the outside wall of the second housing 2 and a plurality of radial grooves 15 are integrally formed in the upper surface of the guard flange 21 for receiving signal readout wires 14. As shown in FIG. 3, the grooves 15, which are formed on the end of the guard member 21, correspond to the terminals 7, 8, 9, 10, 11, formed on the diaphragm 3.

The diaphragm 3 is fixed to the guard flange 21 and inserted into the internal space defined by the flange 19 on the first housing 1. The diaphragm 3 and the flange 21 are secured inside the flange 19 by projections 20 on the end of the flange 19 which are bent inwardly. The diaphragm 3 divides the internal space into a first chamber 17 and a second chamber 18. The second housing 2 presses the diaphragm 3 to the first housing 1 to provide an airtight seal between the first chamber 17 and the second chamber 18.

Figure 2:
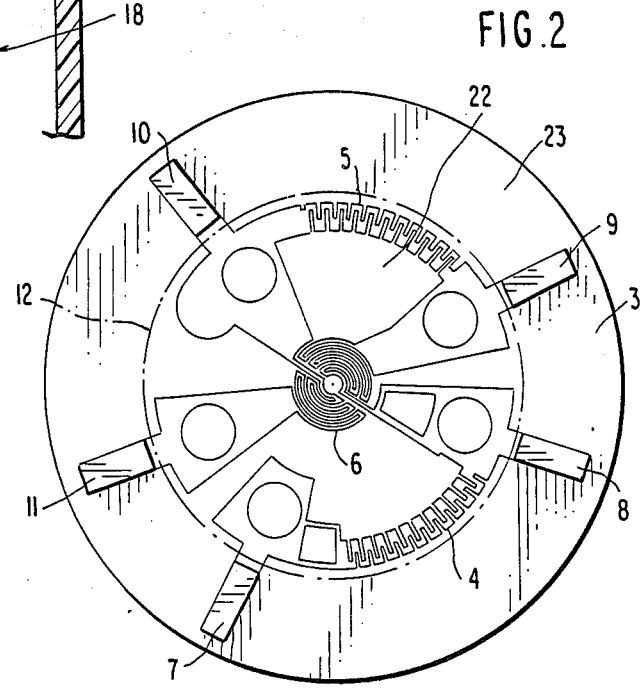
FIG. 2 is a bottom view of a diaphragm according to the preferred embodiment of the present invention.

Referring now to FIG. 2, three strain gauges 4, 5, 6 and five terminals 7, 8, 9, 10, 11, are formed on the diaphragm 3. These strain gauges 4, 5, 6, and terminals 7, 8, 9, 10, 11, are formed by using a thin film vacuum deposition and etching process.

The diaphragm 3 is effectively divided into two parts by the circle 12. One part is a moveable part 22 of the diaphragm 3 and the other part is a stationary part 23 of the diaphragm 3. In other words, the moveable part 22 of the diaphragm 3 is a dividing part which separates the first chamber 17 from the second chamber 18 and the stationary part 23 of the diaphragm 3 is a securing part which is held between the first housing 1 and the second housing 2. The three strain gauges 4, 5 6, are formed on the moveable part 22, i.e., within the circle 12. The five terminals 7, 8, 9, 10, 11, extend from the outer circumferential portion of the moveable part 22 substantially across the stationary part 23, that is to say, in a radial direction across the circle 12.

The strain gauges 4, 5, 6 and the terminals 7, 8, 9, 10, 11, are electrically and serially connected as set forth hereinafter:

terminal 7—strain gauge 4—terminal 8—strain gauge 6—terminal 9—strain gauge 5—terminal 10—strain gauge 6—terminal 11.

Readout wires 14 are electrically connected by soldering or bonding to the portions of the terminal 7 and 11 located in the stationary part 23 of the diaphragm 3. The readout wires 14 do not prevent the clamping of the diaphragm 3 between the first housing 1 and the second housing 2 since the readout wires are disposed in grooves 15 formed in the guard member 21 of the second housing 2 at the points of connection to the diaphragm 3.

When pressure is applied to the central bore 16 a pressure differential is generated between the first chamber 17 and the second chamber 18 thereby causing a displacement of the central portions 22 of the diaphragm 3.

This displacement of the diaphragm 3 is converted into a change in the electrical resistance of the strain gauges 4, 5, 6. The resistance change of the strain gauges 4, 5, 6, is directly related to the displacement of the diaphragm 3. Therefore upon application of a given voltage to the strain gauges 4, 5, 6, the pressure difference between first chamber 17 and second chamber 18 will be converted into an electrical signal.

The electrical signal is amplified by an amplifier (not shown) which is included in the second housing 2 and then supplied out of the housing through the bottom wall of the second housing 2 by means of conductive wires. This amplifier can easily be exchanged for some other devices such as an A/D converter in order to enable the output signal to be applied to computers.

In this invention, since the connections between the terminals 7, 11, and readout wires 14 are located at the stationary part 23 of the diaphragm 3, there is no stress at these connections when the displacement of the diaphragm 3 is generated. Therefore the pressure sensor according to the present invention can detect pressure changes with a high degree of sensitivity.

Further, the terminals 7, 8, 9, 10, 11, are not apt to separate from the diaphragm 3 since there are no stresses at the connections between the terminals 7, 11, and readout wires 14. Thus, the pressure sensor according to this embodiment can provide a pressure sensor with a long life.

While the invention has been particularly shown and described with reference to preferred embodiments thereof it will be understood by those in the art that the foregoing and other changes in form and details may be made therein without departing from the spirit and scope of the invention.

What is claimed is:

1. A pressure sensor comprising:
   pressure responding means comprised of a diaphragm having a stationary part and a moveable part adapted to be displaced relative to said stationary part in response to a pressure applied thereto;
   support means including a first housing adapted to be connected to a pressure source and a second housing adapted to be connected to the atmosphere, said stationary part of said diaphragm being sealing secured between said first and second housings;
   chamber means defined in said support means by said diaphragm;
   detecting means connected to said moveable part of said diaphragm to detect displacement thereof upon application of pressure to said moveable part; and
   terminal means fixed to said stationary part of said diaphragm;
   wherein said second housing is provided with a plurality of grooves adjacent said diaphragm and said terminal means are comprised of electrical terminals disposed in said grooves.

2. A pressure sensor according to claim 1 wherein said detecting means is comprised of a plurality of strain gauges secured to said moveable part of said diaphragm and electrically connected to said terminals adjacent said stationary part of said diaphragm.

* * * * *